J. W. KOHLHEPP.
SCRAPING AND CLEANING MACHINE FOR CARCASSES.
APPLICATION FILED MAR. 21, 1914.
1,260,270.
Patented Mar. 19, 1918.
5 SHEETS—SHEET 1.
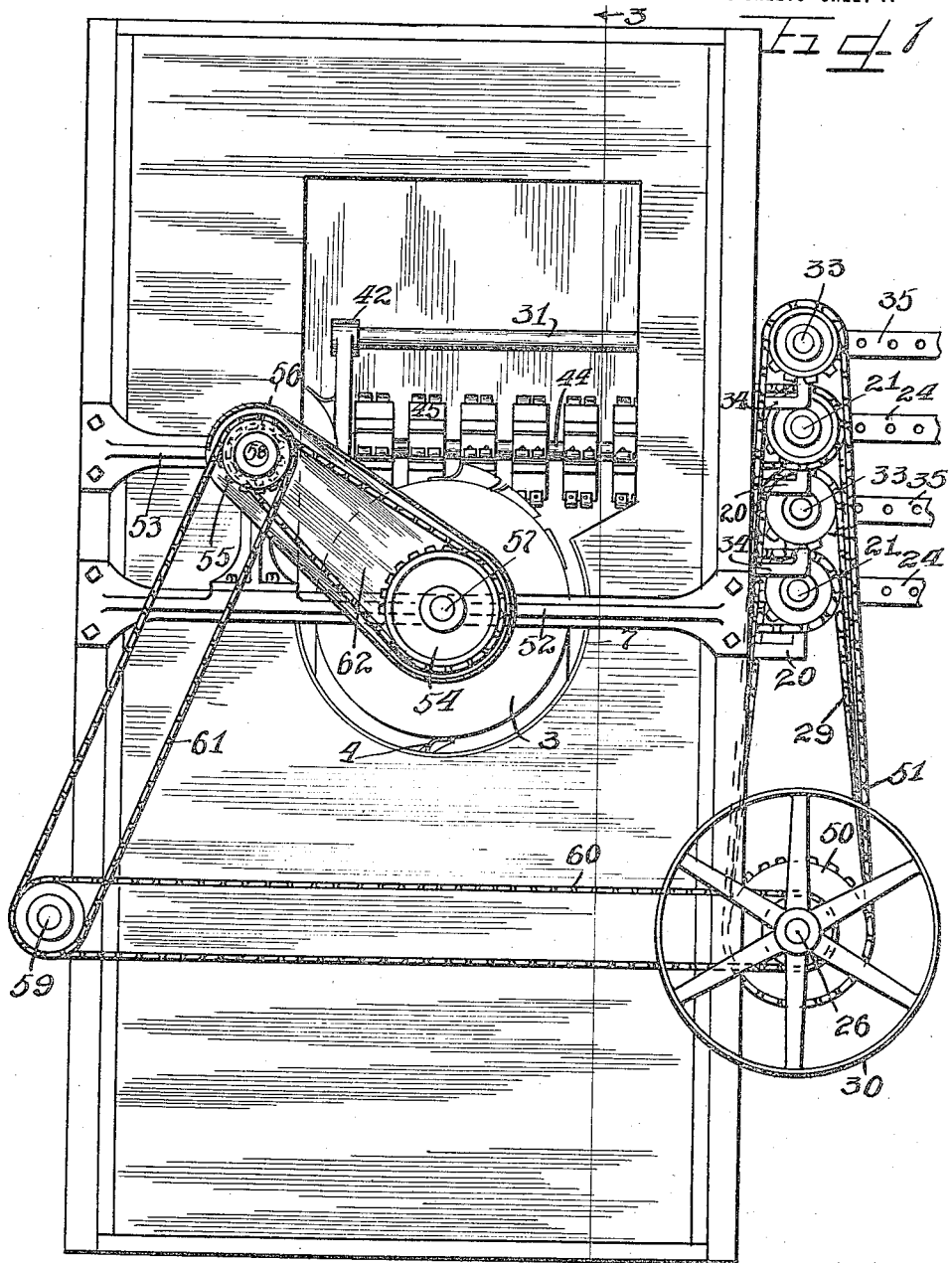

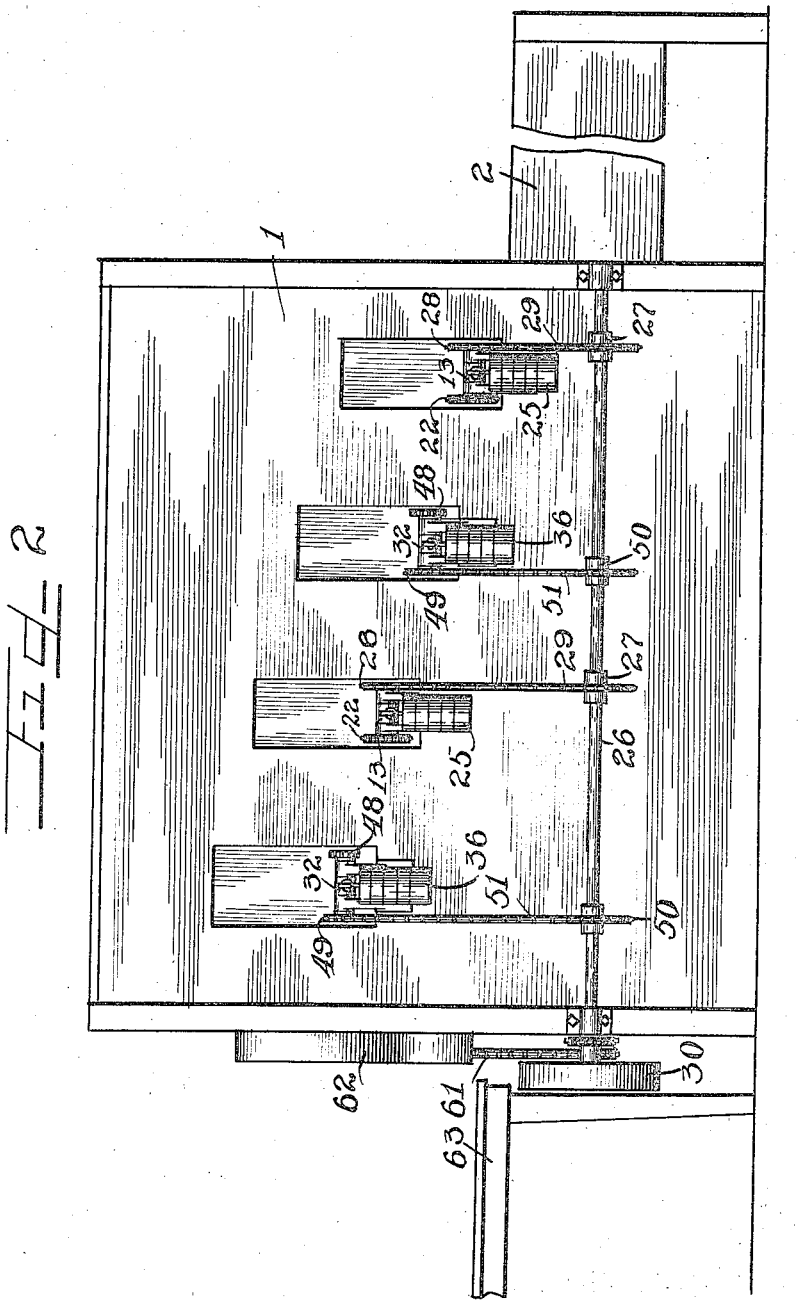

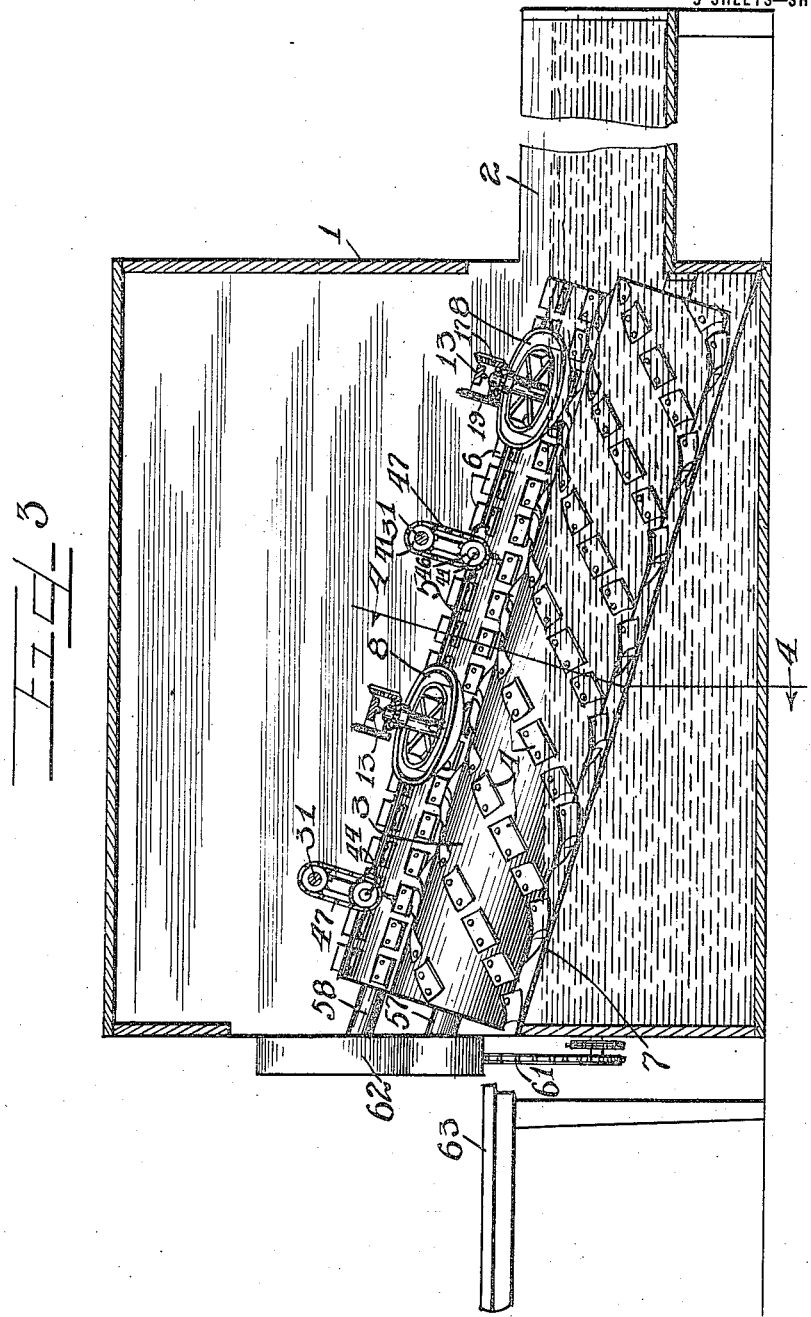

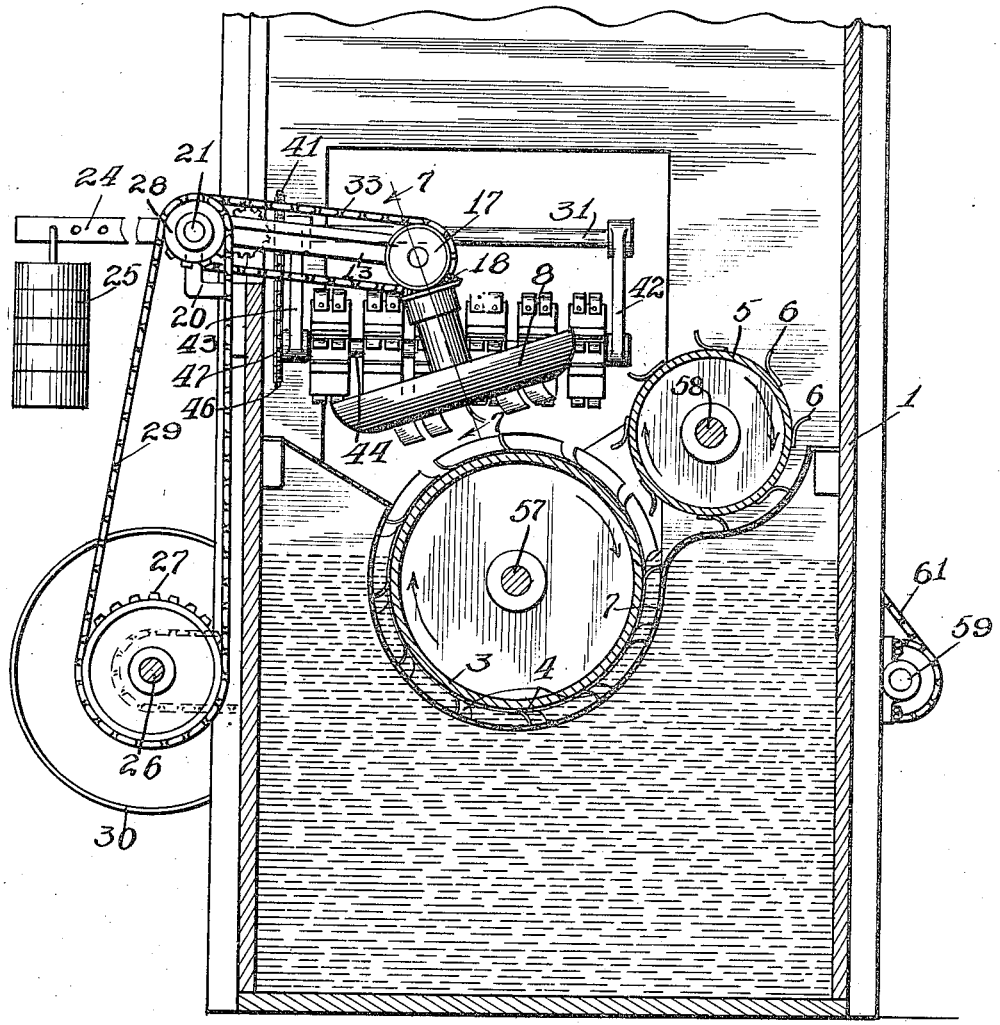

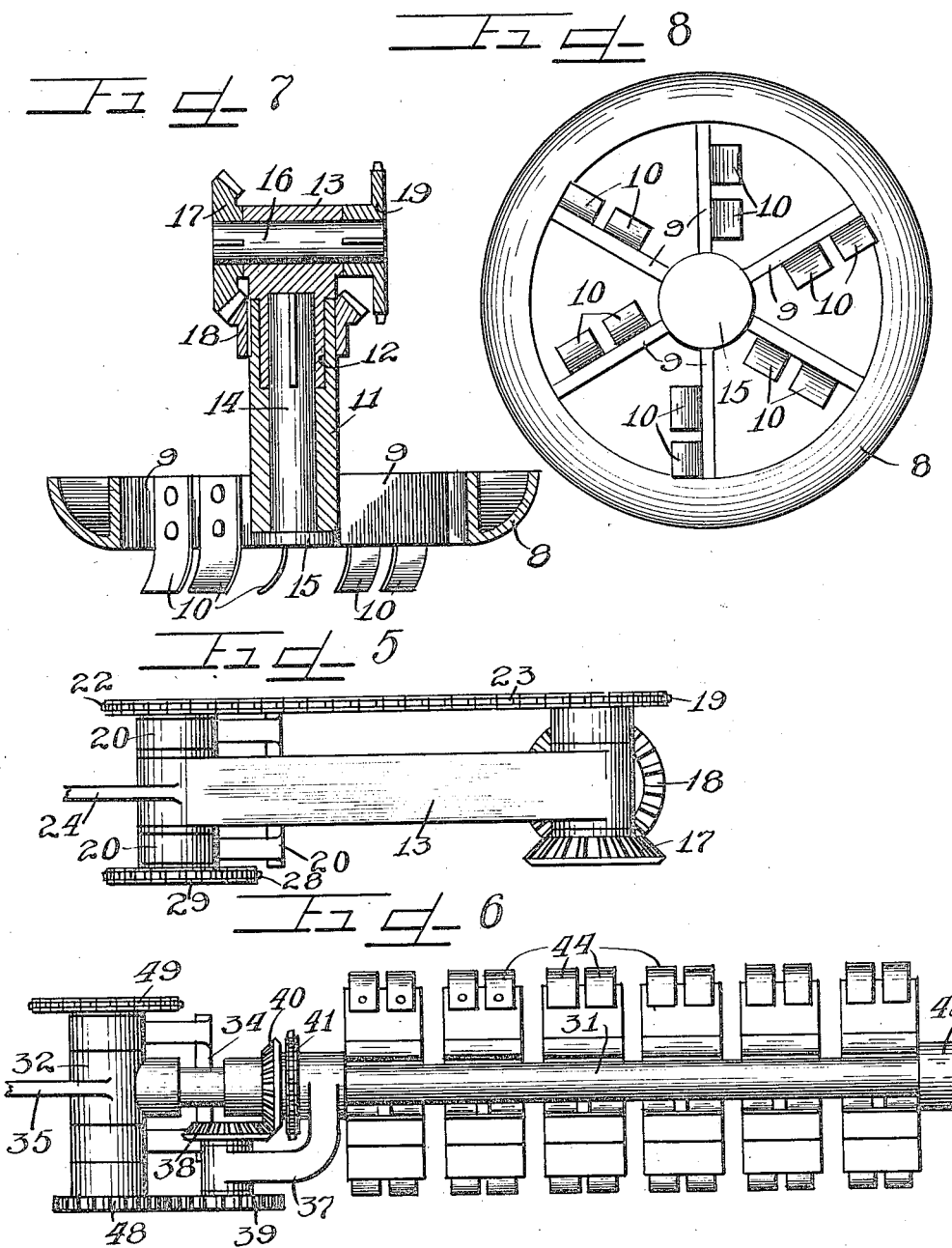

UNITED STATES PATENT OFFICE.

JOHN W. KOHLHEPP, OF CHICAGO, ILLINOIS, ASSIGNOR TO THE ALLBRIGHT-NELL COMPANY, A CORPORATION OF ILLINOIS.

SCRAPING AND CLEANING MACHINE FOR CARCASSES.

1,260,270.

Specification of Letters Patent.

Patented Mar. 19, 1918.

Application filed March 21, 1914. Serial No. 826,225.

*To all whom it may concern:*

Be it known that I, JOHN W. KOHLHEPP, a citizen of the United States, and resident of the city of Chicago, in the county of Cook and State of Illinois, have invented certain new and useful Improvements in Scraping and Cleaning Machines for Carcasses; and I do hereby declare that the following is a full, clear, and exact description of the same, reference being had to the accompanying drawings, and to the numerals of reference marked thereon, which form a part of this specification.

A number of means have been used to dehair a carcass, and in general the carcass is first scalded and then subjected to the action of beaters or scrapers, which, by contact with the skin of the carcass, serve to remove the hair therefrom. In some of the machines for performing the purpose, the beating operation is more or less violent, sometimes tearing the skin of the carcass. However, a striking similarity in practically all machines operating upon this principle is the fact that the scraper beating mechanisms, which are generally rotary, have a linear movement over the skin of the carcass.

This invention relates to a dehairing machine in which scraping mechanisms are provided for removing the hair and scurf from the carcass, as well as rotary scrubbers or polishers which not only complete the scraping operation, but serve also to impart to the skin of the carcass a high polish.

It is an object of this invention to construct a dehairing machine wherein scraping means serve to convey and elevate a carcass in its progress through the machine, submitting it to the action of other dehairing mechanisms, as well as rotating polishing means, which have a circular movement over the surface of the carcass.

It is also an object of this invention to construct a hog dehairing machine wherein a plurality of inclined rolls serve to support and convey a carcass through the machine, acting to scrape the carcass during movement thereof, and subjecting the same to the action of other scrapers, as well as rotary polishers.

It is also an object of this invention to construct a carcass dehairing machine wherein scraping mechanisms having a substantially linear movement act upon the carcass, together with scrapers and polishers which have a circular or rotational movement over the skin of the carcass to impart a high polish thereto.

It is also an object of this invention to construct a machine in which rolls act to convey, rotate, support and dehair a carcass, and at the same time subject it to the action of polishing mechanisms in its progress through the machine.

It is also an object of this invention to construct a machine wherein combined conveying, supporting and scraping means serve to pass a carcass through the machine, subjecting it to the action of other scraping means, as well as polishing mechanisms, said scraping means and polishing mechanisms adjustable and counter-balanced to assume a proper position for operation on carcasses of different size.

It is furthermore an object of this invention to construct a machine wherein carcasses are conveyed therethrough and subjected to a continuous scraping action upon their under surfaces, and alternately to the scraping and polishing action of mechanisms for the purpose on the upper surfaces thereof.

It is finally an object of this invention to construct a machine which, in a short space of time, and within a relatively short length of travel, will serve to efficiently convey, dehair, and polish a carcass by mechanisms acting on all its surfaces.

The invention (in a preferred form), is illustrated in the drawings and hereinafter more fully described.

In the drawings:

Figure 1 is a view in elevation of the discharge end of a machine.

Fig. 2 is a side elevation of a machine.

Fig. 3 is a section taken on line 3—3 of Fig. 1.

Fig. 4 is a transverse section taken on line 4—4 of Fig. 3.

Fig. 5 is a top plan view of the drive for the polishing mechanism.

Fig. 6 is a top plan view of the pivotal support and drive for the upper scrapers.

Fig. 7 is a section taken on line 7—7 of Fig. 4.

Fig. 8 is a bottom plan view of the scraper and polisher illustrated in Fig. 7.

As shown in the drawings:

The machine consists of a casing or tank 1, in which the mechanisms for operating on the hog are contained, said casing being preferably closed, except at its entrance and exit end to prevent the rapidly moving mechanisms from splashing or discharging water from the machine. Communicating with said tank 1, at its entrance end is a scalding tank 2, of a length to receive a sufficient number of hogs therein, whereby each hog in its passage through the scalding tank remains therein for a sufficient time to be properly scalded. Mounted longitudinally in the tank 1, partially submerged in the water therein, and inclining upwardly from the entrance to the discharge end of said tank, is a drum or roll 3, journaled to rotate in said tank, and provided with a plurality of scrapers 4, helically disposed around said roll. The purpose of mounting the scrapers 4, in a helix on said roll is to enable the scrapers to advance, as well as dehair the carcass when the roll rotates, so that said roll serves not only as a support for the carcass, but also as a conveying and scraping means which rotates and advances the carcass lengthwise longitudinally through the machine.

Another smaller roll 5, is journaled parallel said roll 3, slightly above and a little to one side thereof, and is provided with a plurality of scrapers 6, arranged longitudinally thereof in straight lines. The scrapers 6, act upwardly upon a carcass as is readily apparent from the direction of rotation of said respective rolls 3 and 5, indicated by the arrows in Fig. 4. A sheathing 7, preferably of sheet metal, extends from side to side within the tank 1, beneath the respective rolls 3 and 4, conforming to the curvature thereof, and is adapted to receive the hair scraped from the carcasses, permitting the scrapers 4, as they sweep around on the under side of the roll, to thrust the hair upwardly and forwardly on said sheathing 7, to be discharged at the forward end of the machine.

A plurality of polishing mechanisms are mounted within the tank above the roll 3, so that one portion of said polishing mechanism may operate upon a carcass lying on the roll 3, against the roll 5. Each mechanism comprises a circular disk 8, with the edges turned upwardly to afford a smooth surface, and provided with a plurality of radial arms 9, on which are mounted scraping members 10. Said polishing disk 8, is provided with an elongated hub 11, which is journaled at its upper end upon a downwardly directed tubular stud 12, which forms a part of a supporting bracket 13. A stud pin or stationary shaft 14, provided with an enlarged head 15, extends through the hub 11, of said disk and is rigidly keyed in said tubular stud member 12, so that the hub of said disk rotates on said pin 14, and stud 12, the pin 14, serving to hold the disk attached to the bracket 13.

Journaled on the end of said bracket 13, is a shaft 16, with the axis of the shaft in the same plane with the axis of said stud pin 14, and keyed upon one end of said shaft 16, is a bevel pinion 17, which meshes with a bevel pinion 18, rigidly secured upon the upper end of the hub 11, of said polishing disk. Keyed upon the other end of said shaft 16, is a sprocket wheel 19, which receives power to drive said bevel pinion to rotate the disk.

Brackets 20, are provided on the outside of said tank 1, and mounted therein are shafts 21, on which are journaled the ends of said brackets 13, permitting the bracket and its mechanisms to project into the tank through apertures in its walls and to be swung through an arc within the tank. Rigidly secured upon one end of each of said shafts 21, is a sprocket wheel 22, and trained thereabout and about said sprocket 19, is a chain 23, to transmit the power to the latter sprocket wheel.

Integral with, or rigidly secured to said bracket 13, is a lever arm 24, which extends outwardly from the side of the tank, and is provided with apertures adapted to receive hooked through any one thereof, a variable counterweight 25. Accordingly, said bracket 13, may be almost exactly balanced about said pivot shaft 21, but preferably with a difference of weight with the excess in favor of the bracket and polishing mechanism on the interior of the tank, to normally hold the same downwardly toward the rolls, as clearly shown in Fig. 4.

Mounted horizontally on the exterior of the tank 1, and extending longitudinally thereof is a main driving shaft 26, keyed on which are sprocket wheels 27, to drive the polishing mechanism. For this purpose a sprocket wheel 28, is rigidly secured upon the end of said shaft 21, opposite said sprocket wheel 22, and trained over one of said sprocket wheels 27 and 28, are chains 29. A driving pulley 30, is secured upon the end of said shaft 26, to receive a drive from any suitable source of power desired.

Also projecting into the tank 1, and extending over said rolls 3, are scraping mechanisms, which are likewise pivotally mounted and counterweighted to adjust themselves to the proper height automatically for different size carcasses passing through the machine. These scraping mechanisms comprise a non-rotatable supporting shaft 31, which extends into a bracket 32, pivotally mounted upon a shaft 33, which in turn is journaled in a bracket 34, secured on the outside of the tank corresponding and similar to the bracket 20, already mentioned. A lever arm 35, is integrally formed upon said bracket 32, and is adapted to receive at different points thereon a variable counterweight 36. A right angled bracket 37, is rigidly secured upon said stationary supporting shaft 31, and has journaled therein at right angles to said shaft 31, a short shaft on one end of which is secured a bevel pinion 38, and on the other end of which is secured a gear 39. A bevel pinion 40, is journaled upon said stationary shaft 31, and meshes with said pinion 38, and a sprocket wheel 41, is rigidly associated with said pinion 40, to receive and transmit the power therefrom.

Rigidly mounted upon the outer end of said stationary shaft 31, is a downwardly directed depending bracket arm 42, and similarly near the inner end of said shaft 31, and integral with said right angled bracket 37, is a depending bracket arm 43, said bracket arms serving to support a shaft 44, rotatably therein. A plurality of scrapers 45, are secured upon said shaft 44, each scraper comprising four outwardly directed arms at right angles with one another. For the purpose of driving said shaft 44, a sprocket wheel 46, is keyed upon one end thereof adjacent said bracket arm 43, and trained thereabout and about said sprocket wheel 41, is a driving chain 47. Secured upon one end of said shaft 33, is a gear 48, which meshes with said gear 39, and on the opposite end of said shaft is a sprocket wheel 49, which receives the power from the main driving shaft 26, from a sprocket 50, secured on said shaft through a driving chain 51.

It is readily apparent that the drive to the scraper shaft 44, is unaffected by movement of said bracket 32, upon the shaft 33, as a pivot, the intermeshing gears 39 and 48, permitting the pivotal movement to take place without interfering with the transmission of power. Also, as in the case of the polishing mechanism, said scrapers 45, and mechanisms associated therewith are slightly heavier than the counterweights 36, so that the scraping mechanism normally swings down toward the carcass and automatically adjusts itself relatively thereto.

Mounted on the exterior of the discharge end of the machine, are bearing brackets 52 and 53, respectively. Journaled on the bracket 52, is a sprocket wheel 54, and similarly a sprocket wheel 55, is journaled in said bracket 53. A small sprocket wheel 56, shown in dotted lines in Fig. 1, is rigidly secured to said sprocket 55, and a chain is trained thereover and over said sprocket wheel 54, and, due to the difference in diameter of said sprocket wheels, obviously the number of revolutions per minute of the sprocket wheel 54, is less than that of the sprocket wheel 56. Said respective sprocket wheels 54 and 56, are connected to the drums 3 and 5, respectively, by means of shafts 57 and 58, so that each of said drums is caused to rotate with its respective sprocket wheel.

Consequently, the drum 3, rotates considerably slower than the smaller drum 5. A jack shaft 59, is mounted on the casing 1, on the opposite side from said shaft 26, and is driven from said shaft 26, by means of a chain 60. A chain 61, engages over the sprocket wheel 56, and over a sprocket wheel on said shaft 59, to transmit the drive to the respective rolls from said jack shaft. A casing 62, is provided, which incloses said gears 54, 55 and 56, as well as the driving chains, so that as the carcass is discharged, it contacts with said guard and is protected from contact with the driving mechanism.

A table 63, is conveniently positioned at the discharge end of the machine, to receive the scraped and polished carcasses for transfer therefrom for further operations.

The operation is as follows:

The carcass to be operated upon is admitted from the scalding tank 2, into the tank 1, through an aperture in the end of the latter, and the rotating roll 3, with the helically disposed scrapers thereon, advances the carcass forwardly and upwardly through the machine. As the carcass leaves the water in which the lower end of said roll 3, is submerged, it is entirely supported by the roll, is rotated thereby and is also scraped, and advanced simultaneously. The more rapidly rotating roll 5, assists the roll 3, in supporting the carcass, which lies longitudinally therebetween, and the scrapers on said latter roll also assist in dehairing the animal. As the carcass passes through the machine, it is acted upon by the scrapers 45, which are adjustably mounted and counter-weighted so as not to bear too heavily upon the carcass and tear the same. The rotating disks 8, provided with scrapers, serve to scrub and polish the carcass, due to the rotational or circular movement of the scrapers thereover, and which, of course, move with high speed. The rotatable polishing disks 8, are also adjustably mounted and counter-weighted so as to contact with the carcass with a predetermined pressure determined by the adjustment of the counter-weights. The direction of rotation of the scrapers 45, is such as to assist the carcass in its movement through the machine, and likewise the direction of rotation of the disks 8, of which substantially only the upper portion thereof contacts with the carcass, is in a direction to assist the carcass in its movement through the machine.

Of course the various gear ratios to regulate the relative speed of the different mechanisms which operate upon the carcass may be changed and adjusted to suit conditions without varying from the principles of the invention.

I am aware that various details of construction may be varied through a wide range without departing from the principles of this invention. I therefore do not purpose limiting the patent granted otherwise than necessitated by the prior art.

I claim as my invention:

1. In a device of the class described, means conveying a carcass longitudinally in inclined position, beating mechanisms operating with a linear line of contact on the carcass, and polishing disks operating with a circular path of contact on the surface of the carcass.

2. In a device of the class described, inclined rollers for rotating and supporting a carcass in inclined position and acting to convey the carcass longitudinally, beating mechanisms adjustable as a whole for movement to and from the carcass adapted to operate on said carcass along a linear line of contact on the surface thereof while the carcass is on said rollers, and polishing devices operating on said carcass with a circular path of contact with the surface thereof.

3. In a device of the class described, means advancing a carcass longitudinally in inclined position, adjustable beating mechanisms operating on the carcass, and rotary polishing disks bearing upon the carcass and operating thereon along a circular path of contact on the surface of the carcass.

4. In a device of the class described, inclined means for conveying a carcass longitudinally, scraping mechanisms operating thereon, and adjustable counter-weighted polishing devices bearing upon the carcass and having a rotary movement over the surface thereof to contact the carcass along a circular path thereon.

5. In a machine of the class described, cooperative rotating means for supporting and rotating a carcass, scraping mechanisms to advance the carcass longitudinally of said means, scraping mechanisms disposed above said means acting to scrape the carcass and assist the same in its movement through the machine, and adjustably mounted rotary polishing devices disposed to bear upon and contact the surface of the carcass along a circular path of movement thereon.

6. In a device of the class described, a pair of inclined rotating means for conveying a carcass longitudinally in inclined position while continuously rotating the same, swinging beating mechanisms normally swinging downwardly rotating over and in contact with the carcass, and adjustable to and from the same and swinging polishing mechanism acting on the carcasses.

7. In a device of the class described, an inclined roller for rotating and supporting a carcass in inclined position, and acting to convey the carcass longitudinally therealong, rotating beating mechanisms pivotally mounted to swing toward and away from the carcass and adapted normally to bear thereon and operate upon the carcass while on said roller and polishing disks acting on the carcasses to polish the same.

8. In a device of the class described, means advancing a carcass longitudinally in inclined position, adjustably mounted counter-weighted beating mechanism operating on the carcass, and adjustable rotary polishing means adapted to swing into a position with its axis of rotation normal to the surface of the carcass and contacting the same along a circular path of movement.

9. In a device of the class described, inclined spiral means for conveying a carcass longitudinally while rotating the same, scraping mechanisms operating on the carcass, and adjustable rotatable polishing mechanism bearing upon the carcass and having a circular movement over the surface thereof to dehair and polish the same.

10. In a device of the class described, rotating means for supporting and rotating a carcass, scraping mechanism on one of said means to advance the carcass longitudinally on said means, dehairing mechanism disposed above said means acting to scrape the carcass longitudinally along straight lines of contact on the surface of the carcass, and polishing devices adjustably mounted and acting rotarily over the surface of the carcass along circular paths of movement on the surface of the carcass.

11. In a device of the class described, cooperative inclined rotatable means to support a carcass, mechanisms on said means to scrape and assist in rotation of the carcass, certain of said mechanisms disposed to advance the carcass relative said supporting means, and polishing disks acting on the carcass along a circular path of movement on the surface of the carcass to polish the same.

12. In a device of the class described cooperative supporting, rotating, and scraping mechanisms for a carcass, scraping means disposed thereabove and acting on the carcass to assist it in its movement on said mechanisms, polishing mechanisms adjustably mounted intermediate the scraping means and counterweighted to contact a carcass rotarily over the surface thereof with a predetermined pressure, and mechanism driving said polishing means in all adjustments thereof.

13. In a device of the class described cooperative inclined rotatable rolls to support a carcass, plates on said rolls to scrape and rotate the carcass, part of said plates disposed to advance the carcass relatively to said rolls, and disks acting over the surface of the carcass with a circular movement to polish the same.

14. In a device of the class described cooperative supporting and rotating scraping mechanisms for a carcass, flexible beaters disposed thereabove and acting on the carcass to assist it in its movement on said mechanisms, polishing disks adjustably mounted and counterweighted to contact a carcass with a predetermined pressure, and mechanism driving said polishing disks in all adjustments thereof.

15. In a machine of the class described, polishing disks acting on a carcass to polish the same and mechanism for rotating carcasses while the polishing disks act thereon.

16. In a machine for scraping and polishing carcasses, mechanism for scraping the carcasses, and polishing disks acting on the carcasses as they are being scraped.

In testimony whereof I have hereunto subscribed my name in the presence of two subscribing witnesses.

JOHN W. KOHLHEPP.

Witnesses:
CHARLES W. HILLS, Jr.,
LEON M. REIBSTEIN.